US012224617B2

(12) United States Patent
Huang et al.

(10) Patent No.: US 12,224,617 B2
(45) Date of Patent: Feb. 11, 2025

(54) POWER SUPPLY SYSTEM

(71) Applicant: Richtek Technology Corporation, HsinChu (TW)

(72) Inventors: Jian-Zhong Huang, Chiayi (TW); Kuan-Hua Chen, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 589 days.

(21) Appl. No.: 17/686,575

(22) Filed: Mar. 4, 2022

(65) Prior Publication Data

US 2022/0311265 A1    Sep. 29, 2022

Related U.S. Application Data

(60) Provisional application No. 63/164,651, filed on Mar. 23, 2021.

(30) Foreign Application Priority Data

Aug. 17, 2021  (TW) .................... 110130343

(51) Int. Cl.
  *H02J 7/34*     (2006.01)
  *H02J 1/10*     (2006.01)

(52) U.S. Cl.
  CPC ................ *H02J 7/34* (2013.01); *H02J 1/102* (2013.01)

(58) Field of Classification Search
  CPC .................................. H02J 7/34; H02J 1/102
  See application file for complete search history.

(56) References Cited

U.S. PATENT DOCUMENTS

2021/0083500 A1*  3/2021  Quek ................... H02J 7/06

* cited by examiner

*Primary Examiner* — Robert Grant
(74) *Attorney, Agent, or Firm* — Tung & Associates

(57) ABSTRACT

A power supply system includes: first and second external path selection circuits respectively controlling first and second powers at first and second nodes to be electrically connected to first or second system ports; and an internal path selection circuit controlling a third power at a third node or a fourth power at a fourth node to be electrically connected to one or more power conversion modules. The first and the second external path selection circuits, the internal path selection circuit and the power conversion modules perform one of the following operations: (1) receiving at least one external power from one or more of the first and second system port, to generate third power at the third node and/or generate fourth power at the fourth node; or (2) converting power from a battery, to generate at least one output power at the first and/or second system port.

18 Claims, 15 Drawing Sheets

POWER SUPPLY SYSTEM

CROSS REFERENCE

The present invention claims priority to U.S. 63/164,651 filed on Mar. 23, 2021 and claims priority to TW 110130343 filed on Aug. 17, 2021.

BACKGROUND OF THE INVENTION

Field of Invention

The present invention relates to a power supply system; particularly, it relates to such power supply system capable of executing power conversion with plural power conversion modules.

Description of Related Art

Please refer to FIG. 1, which shows a schematic diagram of a conventional power supply system 100. As shown by FIG. 1, the conventional power supply system 100 includes a power conversion module 130 and a power conversion module 140, wherein the power conversion module 130 has an end coupled to a first system port 30 and the power conversion module 140 has an end coupled to a second system port 40, while another end of the power conversion module 130 and another end of the power conversion module 140 are commonly coupled to a system voltage VSYS. The power conversion module 130 and the power conversion module 140 operate an inductor L1 and an inductor L2, respectively, to achieve power conversion. The system voltage VSYS charges a battery 60 via a switch Qsbp and also provides power to a system circuit 50.

The prior art shown in FIG. 1 has the following drawback. Because the first system port 30 is only coupled to one single power conversion module 130 and the second system port 40 is only coupled to one single power conversion module 140, the conventional power supply system 100 can only execute power conversion via one single power conversion module. When the conventional power supply system 100 is applied to an application which requires a greater current, the prior art cannot fulfill such requirement.

In view of the above, to overcome the drawback in the prior art, the present invention proposes an innovative power supply system.

SUMMARY OF THE INVENTION

From one perspective, the present invention provides a power supply system, comprising: a first external path selection circuit, which is configured to operably control a first power at a first node to be electrically connected to a first system port or a second system port; a second external path selection circuit, which is configured to operably control a second power at a second node to be electrically connected to the first system port or the second system port; a plurality of power conversion modules including a first power conversion module and a second power conversion module, wherein each of the first power conversion module and the second power conversion module includes a conversion circuit, a first input/output end and a second input/output end, wherein the conversion circuit is configured to operate an inductor, so as to execute bilateral power conversion between the first input/output end and the second input/output end, wherein the first input/output end of the first power conversion module is coupled to the first node, whereas, the first input/output end of the second power conversion module is coupled to the second node; and an internal path selection circuit coupled to the conversion circuits of the power conversion modules, wherein the internal path selection circuit is configured to operably control a third power at a third node to be electrically connected to the conversion circuit of the first power conversion module or the conversion circuit of the second power conversion module, and is configured to operably control a fourth power at a fourth node to be electrically connected to the conversion circuit of the first power conversion module or the conversion circuit of the second power conversion module; wherein the third power is coupled to a system circuit, whereas, the fourth power is coupled to a battery; wherein the first external path selection circuit, the second external path selection circuit, the power conversion modules and the internal path selection circuit selectively execute one of the following operations: (1) receiving at least one external power from at least one of the first system port or the second system port, so as to generate the third power at the third node for providing power to the system circuit and/or generate the fourth power at the fourth node for charging the battery; or (2) converting the power from the battery, so as to generate at least one output power at at least one of the first system port and the second system port.

In one embodiment, the first external path selection circuit, the second external path selection circuit, the power conversion modules and the internal path selection circuit selectively execute one of the following operation modes: (A) in a single port input mode, the first external path selection circuit and the second external path selection circuit both receiving the external power via one of the first system port and the second system port and respectively controlling the external power to be electrically connected to the first input/output ends of the power conversion modules, and the conversion circuits operably converting the external power to generate the third power at the third node and/or generate the fourth power at the fourth node; or (B) in a single port parallel output mode, the conversion circuits converting the power from the battery together and in parallel, to generate the output power at one of the first system port and the second system port.

In one embodiment, in the single port parallel output mode, an output current of the output power is constant.

In one embodiment, in the single port parallel output mode, switching phases of the conversion circuits are interleaved with one another.

In one embodiment, each power conversion module further includes an error amplification circuit, wherein in the single port parallel output mode, the conversion circuits are commonly controlled by one of the error amplification circuits, wherein the error amplification circuit controlling the conversion circuits is configured to operably generate an error amplification signal to control the conversion circuits according to a difference between an electric parameter of the output power and a reference signal.

In one embodiment, the first external path selection circuit, the second external path selection circuit, the power conversion modules and the internal path selection circuit further selectively execute one of the following operation modes: (C) in a plural ports input mode, the first system port and the second system port receiving a first external power and a second external power, respectively, and the first external path selection circuit and the second external path selection circuit controlling the first external power and the second external power to be electrically connected to the first input/output end of the first power conversion module and the first input/output end of the second power conversion module, respectively, wherein the conversion circuits respectively convert the first external power and the second external power to generate the third power at the third node and/or generate the fourth power at the fourth node; (D) in a plural ports parallel input mode, the first system port and the second system port both receiving the external power, and the first external path selection circuit and the second external path selection circuit controlling the external power to be electrically connected to the first input/output end of the first power conversion module and electrically connected to the first input/output end of the second power conversion module, wherein the conversion circuits respectively convert the external power to generate the third power at the third node and/or generate the fourth power at the fourth node; (E) in a plural ports bilateral mode, one of the first system port and the second system port receiving the external power, while, the other one of the first system port and the second system port generating the output power, wherein the first external path selection circuit and the second external path selection circuit control the external power to be electrically connected to a corresponding one of the power conversion modules via the one of the first system port and the second system port, so as to execute power conversion and to generate the third power at the third node and/or the fourth power at the fourth node by control of the internal path selection circuit; wherein the internal path selection circuit controls the fourth power or the third power to be electrically connected to the other power conversion module, so as to execute power conversion and to generate the output power at the other one of the first system port and the second system port by control of the first external path selection circuit and the second external path selection circuit; or (F) in a plural ports output mode, the internal path selection circuit controlling the fourth power to be electrically connected to a corresponding one of the power conversion modules, so that the conversion circuits convert the power from the battery to generate a first output power and a second output power at the first system port and the second system port, respectively, by control of the first external path selection circuit and the second external path selection circuit.

In one embodiment, in the operation mode (C), the first external power provides a constant current or the second external power provides a constant current, or wherein in the operation mode (D) and the operation mode (E), the external power provides the constant current.

In one embodiment, in the operation mode (C), the operation mode (D) and the operation mode (E), at least one of the power conversion modules is further configured to operate under a bypass mode wherein a part of switches of this power conversion module are always ON, whereas, another part of switches of this power conversion module are always OFF, so that the battery is directly charged by constant current charging operation.

In one embodiment, each of the first external path selection circuit and the second external path selection circuit has a first end, a second end and a third end, and wherein each of the first external path selection circuit and the second external path selection circuit includes: a first switch coupled between the first end and the second end; and a second switch coupled between the first end and the third end; wherein the first external path selection circuit has its first end, second end and third end coupled to the first node, the first system port and the second system port, respectively; wherein the second external path selection circuit has its first end, second end and third end coupled to the second node, the second system port and the first system port, respectively.

In one embodiment, each of the power conversion modules further has a third input/output end and further includes: a third switch coupled between the second input/output end and the third input/output end of the power conversion module; wherein the second input/output end and the third input/output end of the first power conversion module are coupled to the third node and the fourth node, respectively; wherein the third input/output end of the second power conversion module is coupled to the fourth node; wherein the internal path selection circuit includes the third switches of the power conversion modules.

In one embodiment, each of the power conversion modules further includes: a first switching end and a second switching end, wherein the conversion circuit of each power conversion module is a buck-boost switching converter and includes: a first upper gate switch coupled between the first input/output end and the first switching end; a first lower gate switch coupled between the first switching end and a ground level; a second upper gate switch coupled between the second input/output end and the second switching end; and a second lower gate switch coupled between the second switching end and the ground level; wherein the conversion circuit of the first power conversion module is configured to operate a first inductor, so as to execute bilateral power conversion between the first input/output end and the second input/output end of the first power conversion module, wherein the first inductor is coupled between the first switching end and the second switching end of the first power conversion module; wherein the conversion circuit of the second power conversion module is configured to operate a second inductor, so as to execute bilateral power conversion between the first input/output end and the second input/output end of the second power conversion module, wherein the second inductor is coupled between the first switching end and the second switching end of the second power conversion module.

In one embodiment, the internal path selection circuit further includes: a fourth switch coupled between the third node and a fifth node, wherein the fifth node is coupled to the second switching end of the second power conversion module.

In one embodiment, the internal path selection circuit further includes: a fourth switch coupled between the third node and a fifth node, wherein the fifth node is coupled to the second input/output end of the second power conversion module; wherein in the operation mode (E), the second system port receives the external power, and wherein in a case when the output power is generated at the first system port, the fourth switch is controlled to be ON, so that the second power conversion module provides power to the system circuit via the fourth switch and the second power conversion module charges the battery via the third switch.

In one embodiment, the first power conversion module charges the battery via the third switch and/or the second power conversion module charges the battery via the third switch.

In one embodiment, the battery provides power to the system circuit via the third switch of the first power conversion module.

In one embodiment, the first system port and the second system port are system ports complying with universal serial bus power delivery (USB PD) specification.

In one embodiment, each power conversion module is integrated into an integrated circuit.

In one embodiment, the first external path selection circuit and the second external path selection circuit are integrated into an integrated circuit.

Advantages of the present invention include: that, the present invention can enhance conversion efficiency; that, the present invention can maximize the utilization of the power conversion modules; and that, the present invention can individually control each charging current, and also can support sharing the charging current.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
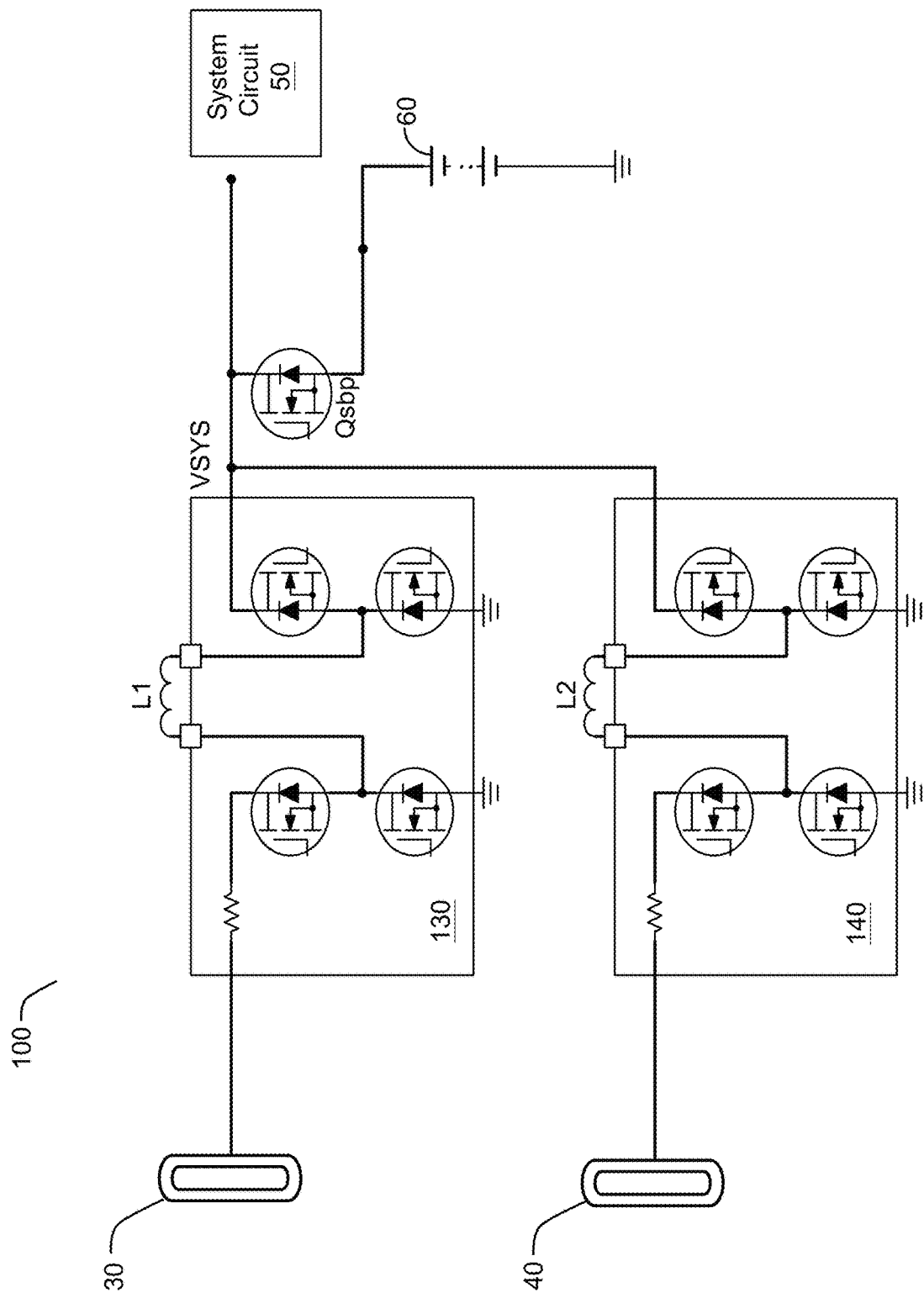
FIG. 1 shows a schematic diagram of a conventional power supply system.
Figure 2A:
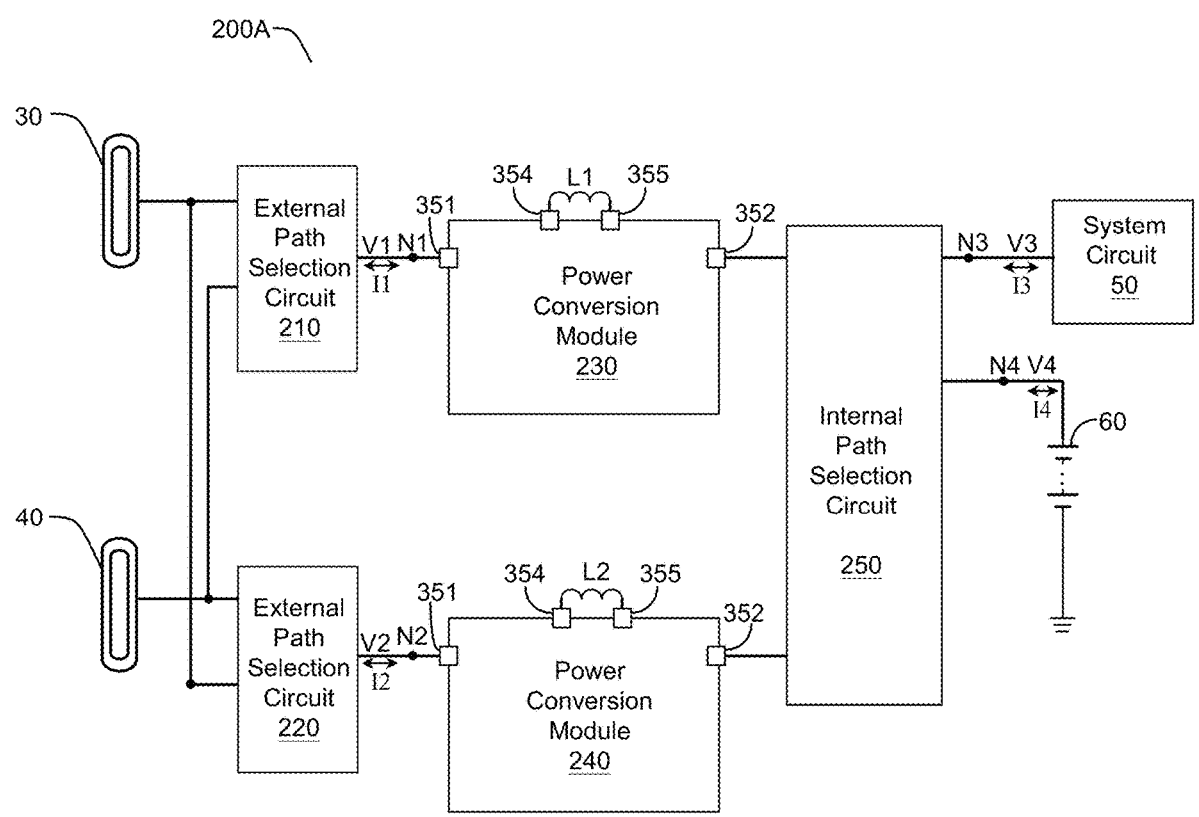
FIG. 2A shows a schematic circuit block diagram of a power supply system according to an embodiment of the present invention.

Please refer to FIG. 2A, which shows a schematic circuit block diagram of a power supply system 200 according to an embodiment of the present invention. As shown in FIG. 2A, in one embodiment, the power supply system 200 includes: an external path selection circuit 210, an external path selection circuit 220, plural power conversion modules and an internal path selection circuit 250. The external path selection circuit 210 is configured to operably control a first power (corresponding to a first voltage V1 and/or a first current I1) at a first node N1 to be electrically connected to a first system port 30 or a second system port 40. In another embodiment, the external path selection circuit 210 can optionally control the first power at the first node N1 to be electrically disconnected from both the first system port 30 and the second system port 40.

The external path selection circuit 220 is configured to operably control a second power (corresponding to a second voltage V2 and/or a second current I2) at a second node N2 to be electrically connected to the first system port 30 or the second system port 40. In another embodiment, the external path selection circuit 220 can optionally control the second power at the second node N2 to be electrically disconnected from both the first system port 30 and the second system port 40. Please refer to FIG. 2B. In one embodiment, the power conversion modules include: a power conversion module 230 and a power conversion module 240. Each of the power conversion module 230 and the power conversion module 240 has: a first input/output end 351 and a second input/output end 352. The power conversion module 230 is configured to operate an inductor L1, so as to execute bilateral power conversion between the first input/output end 351 and the second input/output end 352 of the power conversion module 230. The power conversion module 240 is configured to operate an inductor L2, so as to execute bilateral power conversion between the first input/output end 351 and the second input/output end 352 of the power conversion module 240. In another embodiment, the power conversion modules can be configured to operate another type of energy storage device, such as a capacitor.

Please still refer to FIG. 2A. The internal path selection circuit 250 is coupled to the second input/output ends 352 of the power conversion modules. The internal path selection circuit 250 is configured to operably control a third power (corresponding to a third voltage V3 and/or a third current I3) at a third node N3 to be connected to the second input/output end 352 of the power conversion module 230 or the second input/output end 352 of the power conversion module 240. And, the internal path selection circuit 250 is configured to operably control a fourth power (corresponding to a fourth voltage V4 and/or a fourth current I4) at a fourth node N4 to be connected to the second input/output end 352 of the power conversion module 230 or the second input/output end 352 of the power conversion module 240. The third power is coupled to a system circuit 50, whereas, the fourth power is coupled to a battery 60.

The external path selection circuit 210, the external path selection circuit 220, the power conversion modules and the internal path selection circuit 250 execute one of the following operations: (1) receiving at least one external power from at least one of the first port 30 or the second system port 40, to generate the third power at the third node N3 for providing power to the system circuit 50 and/or generate the fourth power at the fourth node N4 for charging the battery 60; or (2) converting the power from the battery 60 to generate at least one output power (corresponding to an output voltage VOTG and/or an output current IOTG) at at least one of the first system port 30 and the second system port 40.

In one embodiment, in the above-mentioned operation (1), it can be implemented that the power supply system 200 only supplies the third power to the system circuit 50. In another embodiment, in the above-mentioned operation (1), it can be implemented that the power supply system 200 only charges the battery 60 by the fourth power. In still another embodiment, it can be implemented that the power supply system 200 both supplies the third power to the system circuit 50 and charges the battery 60 by the fourth power.

Figure 2B:
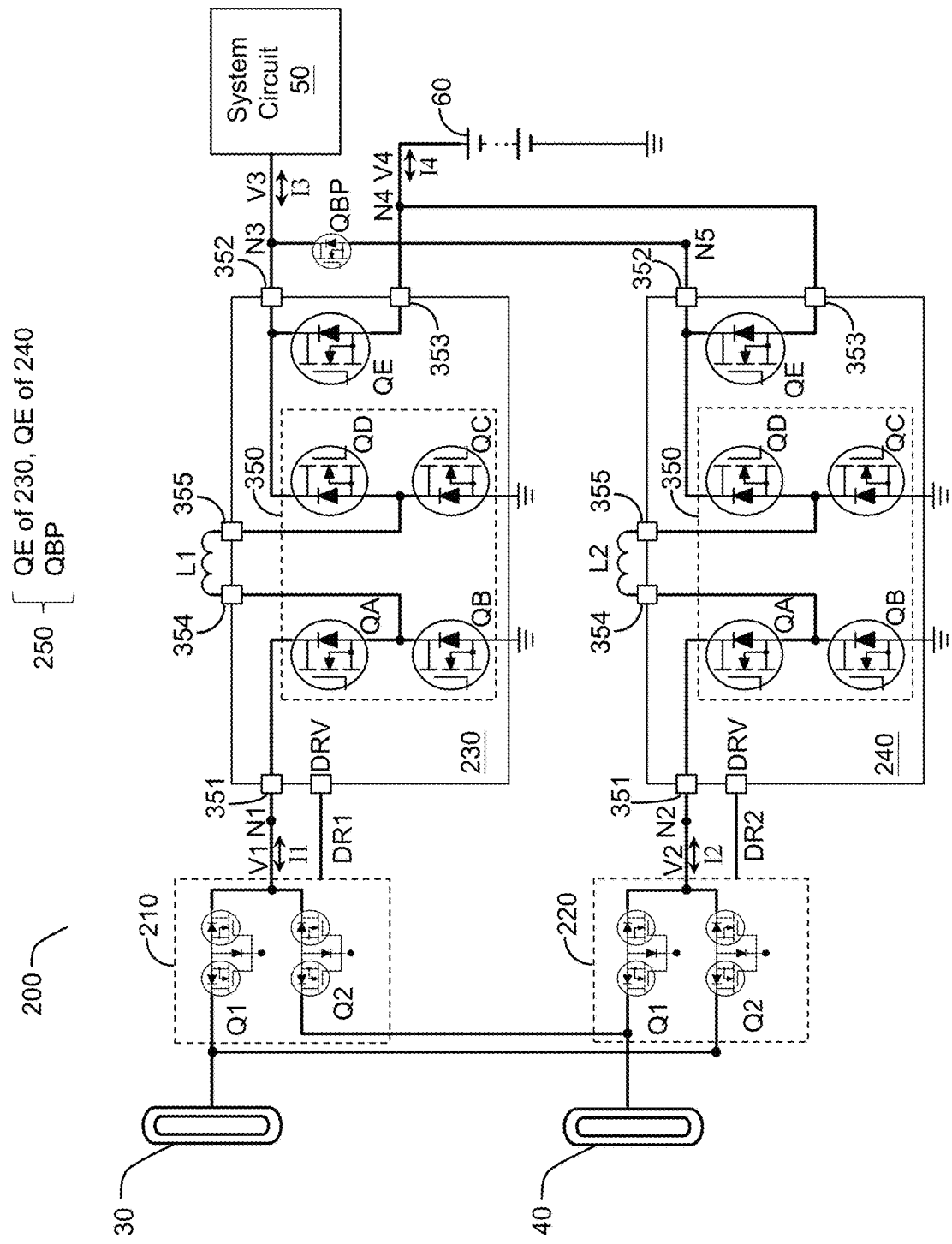
FIG. 2B shows a schematic circuit diagram of a power supply system according to an embodiment of the present invention.

Please refer to FIG. 2B, which shows a schematic circuit diagram of a power supply system 200 according to an embodiment of the present invention. In one embodiment, each of the external path selection circuit 210 and the external path selection circuit 220 has a first end, a second end and a third end, and each of the external path selection circuit 210 and the external path selection circuit 220 includes: a switch Q1 and a switch Q2. The switch Q1 is coupled between the first end and the second end. The switch Q2 is coupled between the first end and the third end. In one embodiment, the external path selection circuit 210 has its first end, second end and third end coupled to the first node N1, the first system port 30 and the second system port 40, respectively. The external path selection circuit 220 has its first end, second end and third end coupled to the second node N2, the second system port 40 and the first system port 30, respectively.

In one embodiment, the external path selection circuit 210 and the external path selection circuit 220 are integrated into an integrated circuit.

Figure 3:
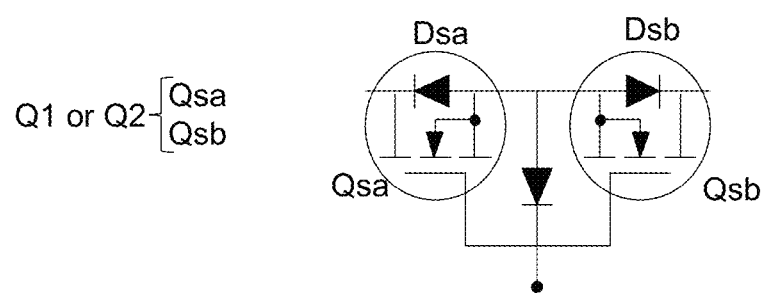
FIG. 3 shows a schematic circuit diagram illustrating an embodiment of switches in a first external path selection circuit and in a second external path selection circuit of a power supply system.

Please refer to FIG. 3, which shows a schematic circuit diagram illustrating an embodiment of the switches Q1 and Q2 of the external path selection circuit 210 and the external path selection circuit 220 in the power supply system 200. As shown in FIG. 3, in the external path selection circuit 210 and in the external path selection circuit 220, each of the switch Q1 and the switch Q2 includes: a first transistor Qsa and a second transistor Qsb connected in series to each other. A body diode Dsa of the first transistor Qsa and a body diode Dsa of the second transistor Qsb are reversely coupled to each other, so that in a case when a control signal (as shown by DR1 or DR2 in FIG. 2B) controls the switch Q1 and the switch Q2 to be OFF, a forward conduction current through anyone of the body diode Dsa and the body diode Dsb will not be generated.

Please still refer to FIG. 2B. The power conversion module 230 and the power conversion module 240 generate the control signals (as shown by DR1 and DR2 in FIG. 2B) at their respective control ends DRV, to control the switch Q1 and the switch Q2 in the external path selection circuit 210 and the external path selection circuit 220. More specifically, as shown in FIG. 2B, the power conversion module 230 generates the control signal DR1, so as to control the switch Q1 and the switch Q2 in the external path selection circuit 210. And, the power conversion module 240 generates the control signal DR2, so as to control the switch Q1 and the switch Q2 in the external path selection circuit 220.

As shown in FIG. 2B, each of the power conversion module 230 and the power conversion module 240 includes a conversion circuit 350. The conversion circuit 350 is configured to operably operate the inductor L1 of the power conversion module 230 and the inductor L2 of the power conversion module 240, so as to execute power conversion. As shown in FIG. 2B, in one embodiment, the conversion circuit 350 is a buck-boost switching converter. In other embodiments, the conversion circuit 350 can be other types of converter, such as a buck switching converter or a boost switching converter. Each of the power conversion module 230 and the power conversion module 240 further has: a first switching end 354 and a second switching end 355. In this embodiment, each conversion circuit 350 in each of the power conversion module 230 and the power conversion module 240 includes: an upper gate switch QA, a lower gate switch QB, a lower gate switch QC, and an upper gate switch QD. The upper gate switch QA is coupled between the first input/output end 351 and the first switching end 354. The lower gate switch QB is coupled between the first switching end 354 and a ground level. The upper gate switch QD is coupled between the second input/output end 352 and the second switching end 355. The lower gate switch QC is coupled between the second switching end 355 and the ground level.

In this embodiment, the first input/output end 351 and the second input/output end 352 of the power conversion module 230 are coupled to the first node N1 and the third node N3, respectively. The inductor L1 is coupled between the first switching end 354 and the second switching end 355. The first input/output end 351 and the second input/output end 352 of the power conversion module 240 are coupled to the second node N2 and the fourth node N4, respectively. The inductor L2 is coupled between the first switching end 354 and the second switching end 355.

The conversion circuit 350 of the power conversion module 230 is configured to operate the inductor L1, so as to execute bilateral power conversion between the first input/output end 351 and the second input/output end 352 (i.e., between the first node N1 and the third node N3).

The conversion circuit 350 of the power conversion module 240 is configured to operate the inductor L2, so as to execute bilateral power conversion between the first input/output end 351 and the second input/output end 352 (i.e., between the second node N2 and the fourth node N4).

In one embodiment, each of the power conversion module 230 and the power conversion module 240 further has a third input/output end 353, and further includes a switch QE. The switch QE is coupled between the second input/output end 352 and the third input/output end 353. In one embodiment, the third input/output end 353 of the power conversion module 230 and the third input/output end 353 of the power conversion module 240 are both coupled to the fourth node N4.

In this embodiment, the internal path selection circuit 250 includes: the switch QE of the power conversion module 230 and the switch QE of the power conversion module 240. In one embodiment, the switch QE controls an electrical connection relationship between the second input/output end 352 and the third input/output end 353 for example by switching or by linear control. From one perspective, in this embodiment, the internal path selection circuit 250 and the power conversion modules 230 and 240 share a portion of the components, that is, a portion of the components of the internal path selection circuit 250 overlap with a portion of the components of the power conversion module 230, whereas, a portion of the components of the internal path selection circuit 250 overlap with a portion of the components of the power conversion module 240.

In one embodiment, the internal path selection circuit 250 further includes a switch QBP coupled between the third node N3 and a fifth node N5. The switch QBP controls an electrical connection relationship between the third node N3 and the fifth node N5. In this embodiment, the fifth node N5 is coupled to the second input/output end 352 of the power conversion module 240.

In one embodiment, the first system port 30 and the second system port 40 are system ports complying with the universal serial bus power delivery (USB PD) specification. In one embodiment, each of the power conversion module 230 and the power conversion module 240 is integrated into an IC.

Figure 4A:
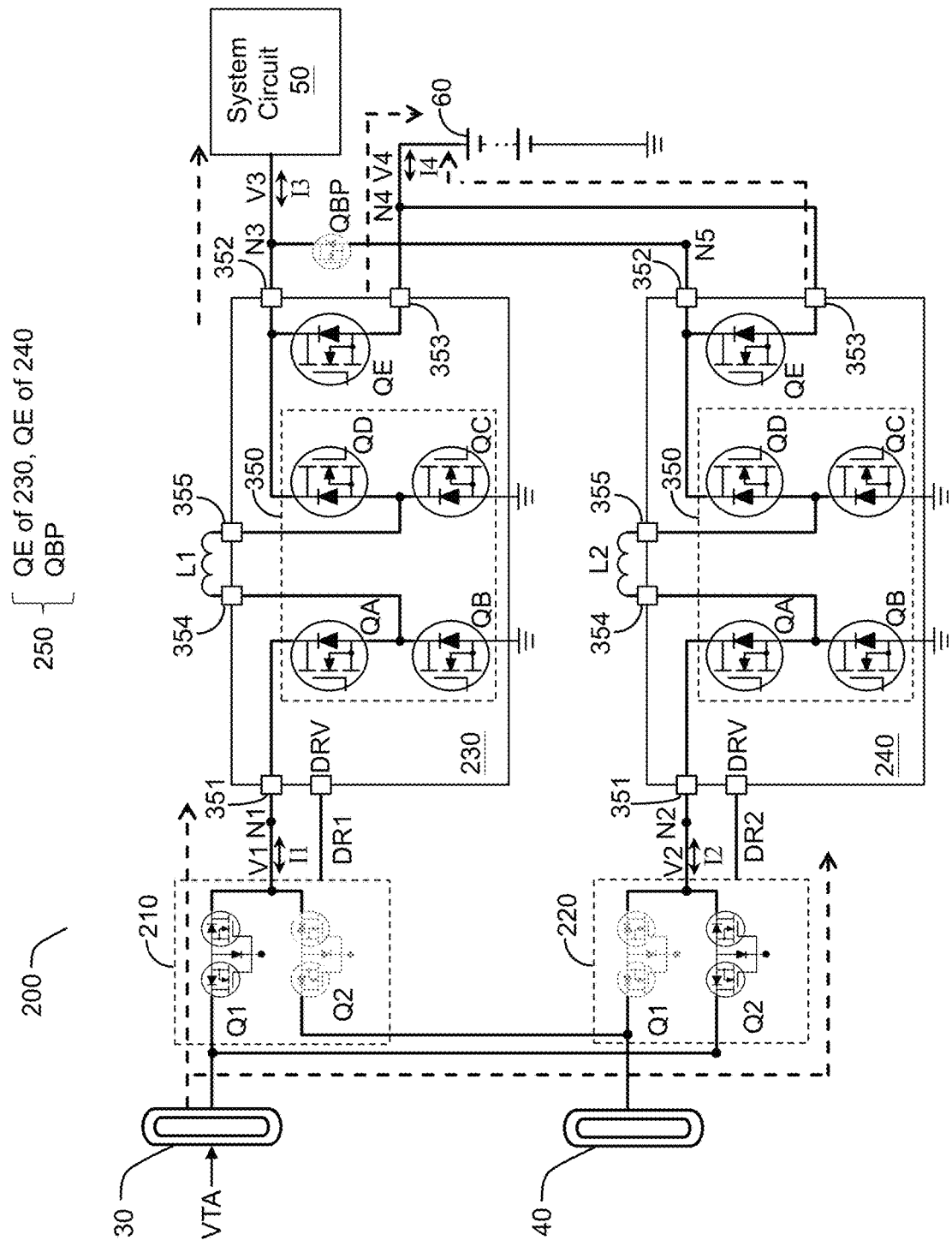
FIG. 4A and FIG. 4B show a circuit configuration of a power supply system according to a specific embodiment of the present invention and illustrate its operation mechanism.

Please refer to FIG. 4A, which shows a circuit configuration of a power supply system according to a specific embodiment of the present invention and illustrates its operation mechanism. In a single port input mode, both the external path selection circuit 210 and the external path selection circuit 220 receive an external power VTA via the first system port 30 and the external path selection circuit 210 and the external path selection circuit 220 control the external power VTA to be electrically connected to the first node N1 and the second node N2 (i.e., the first input/output end 351 of the power conversion module 230 and the first input/output end 351 of the power conversion module 240), respectively. In this embodiment, the switch Q1 of the external path selection circuit 210 and the switch Q2 of the external path selection circuit 220 are both ON, whereas, the switch Q2 of the external path selection circuit 210 and the switch Q1 of the external path selection circuit 220 are both OFF.

The conversion circuit 350 of the power conversion module 230 and the conversion circuit 350 of the power conversion module 240 operably convert the external power VTA to generate the third power at the third node N3 for providing power to the system circuit 50 and/or generate the fourth power at the fourth node N4 for charging the battery 60. In one embodiment, the power conversion module 230 charges the battery 60 via the corresponding switch QE. In one embodiment, the power conversion module 240 charges the battery 60 via the corresponding switch QE.

Figure 4B:
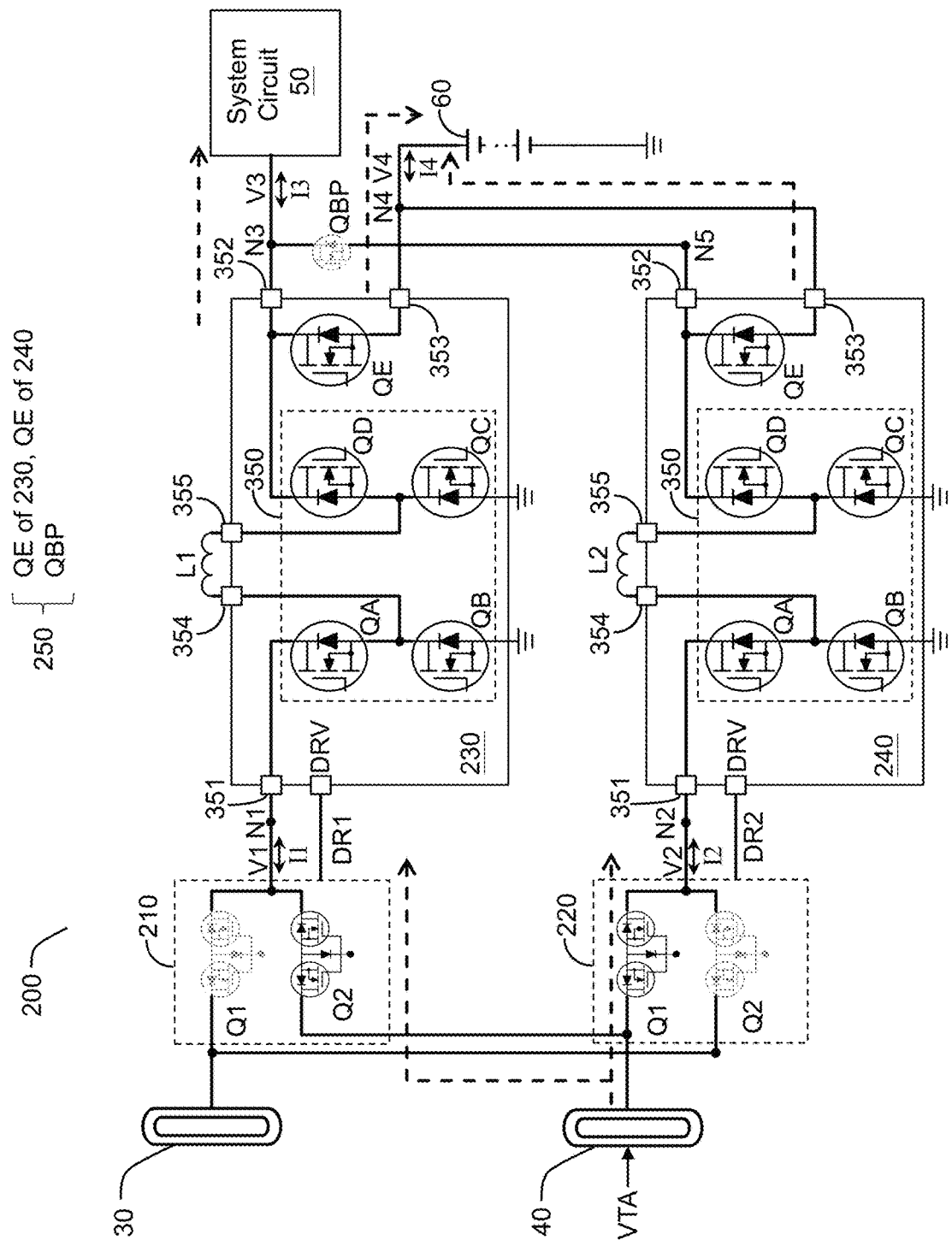

Please refer to FIG. 4B, which shows a circuit configuration of a power supply system according to a specific embodiment of the present invention and illustrates its operation mechanism. In a single port input mode, the external path selection circuit 210 and the external path selection circuit 220 both receive an external power VTA via the first system port 40 and the external path selection circuit 210 and the external path selection circuit 220 control the external power VTA to be electrically connected to the first node N1 and the second node N2 (i.e., the first input/output end 351 of the power conversion module 230 and the first input/output end 351 of the power conversion module 240), respectively. In this embodiment, the switch Q1 of the external path selection circuit 210 and the switch Q2 of the external path selection circuit 220 are both OFF, whereas, the switch Q2 of the external path selection circuit 210 and the switch Q1 of the external path selection circuit 220 are both ON. The rest operations of this embodiment are the same as the embodiment shown in FIG. 4A.

Figure 5A:
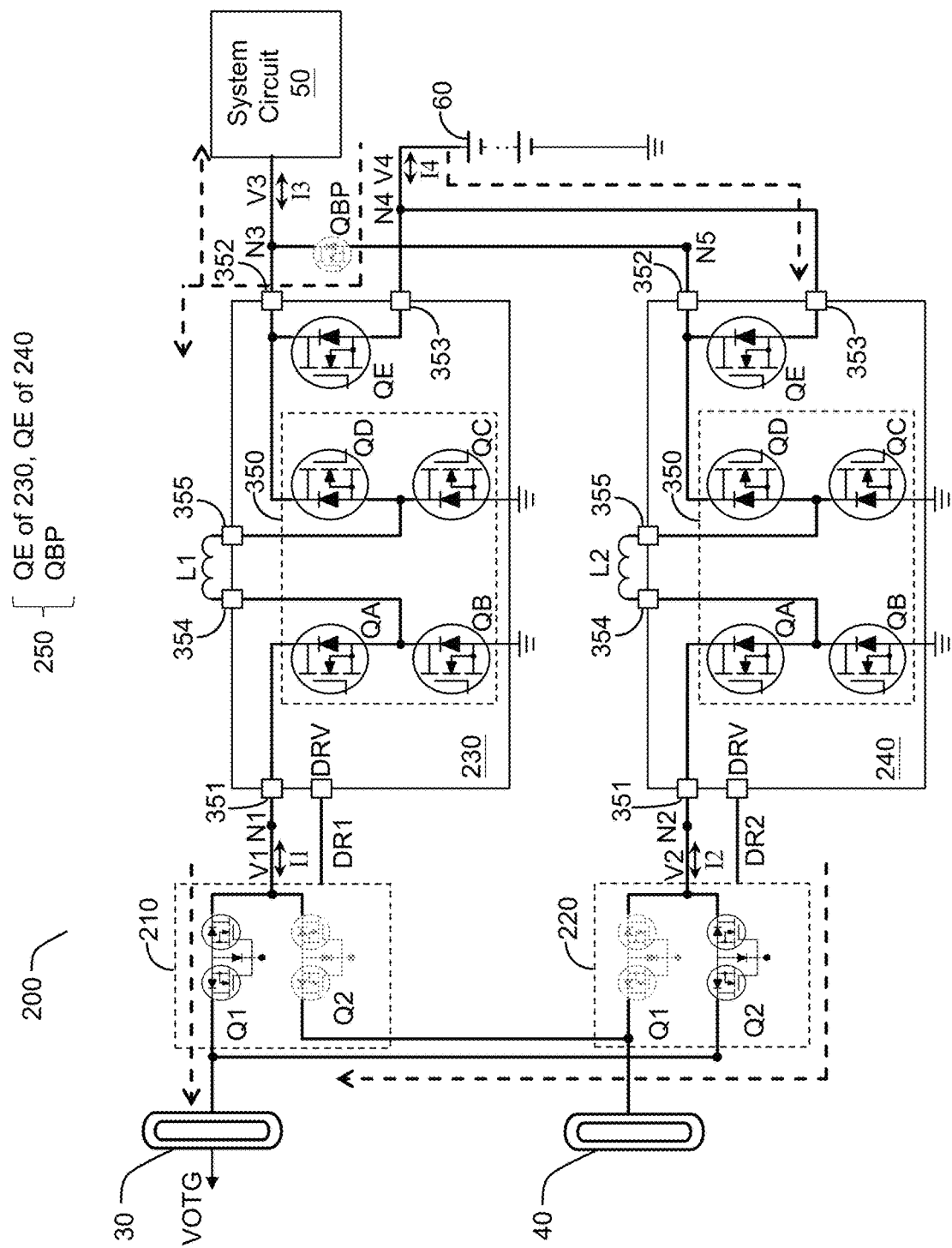
FIG. 5A to FIG. 5C show a circuit configuration of a power supply system according to a specific embodiment of the present invention and illustrate its operation mechanism.

Please refer to FIG. 5A, which shows a circuit configuration of a power supply system according to a specific embodiment of the present invention and illustrates its operation mechanism. In a single port parallel output mode, according to the control by the internal path selection circuit 250, the conversion circuit 350 of the power conversion module 230 and the conversion circuit 350 of the power conversion module 240 both convert the power from the battery 60 to generate the output power in parallel at the first system port 30, wherein the output power corresponds to an output voltage VOTG and/or an output current IOTG. In this embodiment, the battery 60 can further provide power to the system circuit 50 via the switch QE of the power conversion module 230. The switch QE of the power conversion module 230 and the switch QE of the power conversion module 240 are both ON, so that the fourth node N4 is electrically connected to the conversion circuit 350 of the power conversion module 230 and to the conversion circuit 350 of the power conversion module 240, to thereby execute the above-mentioned power conversion. In this embodiment, the switch Q1 of the external path selection circuit 210 and the switch Q2 of the external path selection circuit 220 are both ON, so as to electrically connect the first power generated by the power conversion module 230 and the second power generated by the power conversion module 240 to the first system port 30 in parallel, to thereby generate the above-mentioned output power. On the other hand, the switch Q2 of the external path selection circuit 210 and the switch Q1 of the external path selection circuit 220 are both OFF. In one embodiment, in the single port parallel output mode, the output current IOTG of the output power is constant, capable of providing a high level constant current, for example to charge an external device. Or, the output voltage VOTG of the output power is constant. In one embodiment, in the single port parallel output mode, a switching phase of the conversion circuit 350 of the power conversion module 230 and a switching phase of the conversion circuit 350 of the power conversion module 240 are interleaved with each other, to reduce the output voltage ripple and output current ripple.

Figure 5B:
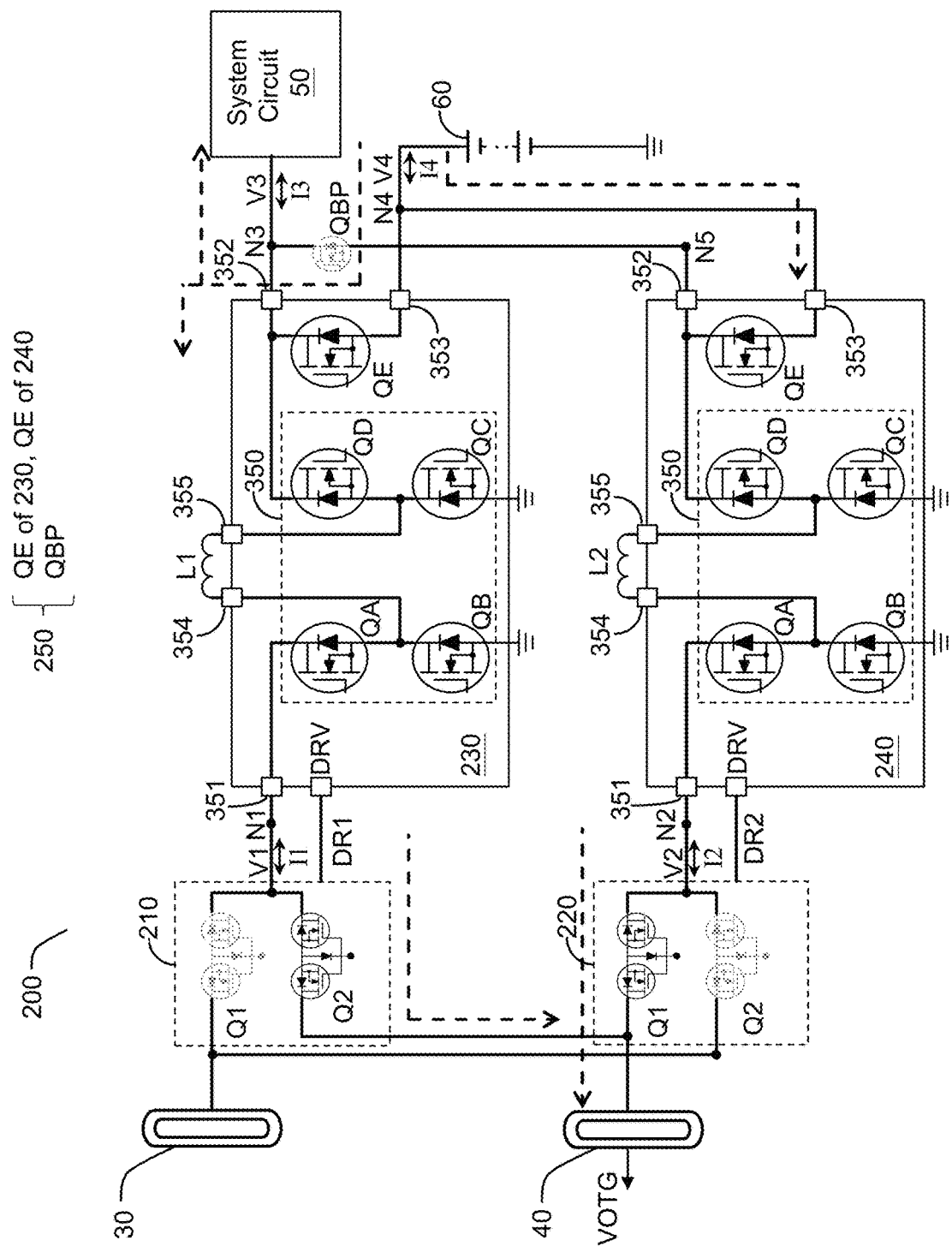

Please refer to FIG. 5B, which shows a circuit configuration of a power supply system according to a specific embodiment of the present invention and illustrates its operation mechanism. This embodiment shown in FIG. 5B is similar to the embodiment shown in FIG. 5A, but is different in that: in this embodiment, the switch Q2 of the external path selection circuit 210 and the switch Q1 of the external path selection circuit 220 are both ON, so as to electrically connect the first power generated by the power conversion module 230 and the second power generated by the power conversion module 240 to the second system port 40 in parallel, to thereby generate the above-mentioned output power. On the other hand, the switch Q1 of the external path selection circuit 210 and the switch Q2 of the external path selection circuit 220 are both OFF.

Figure 5C:
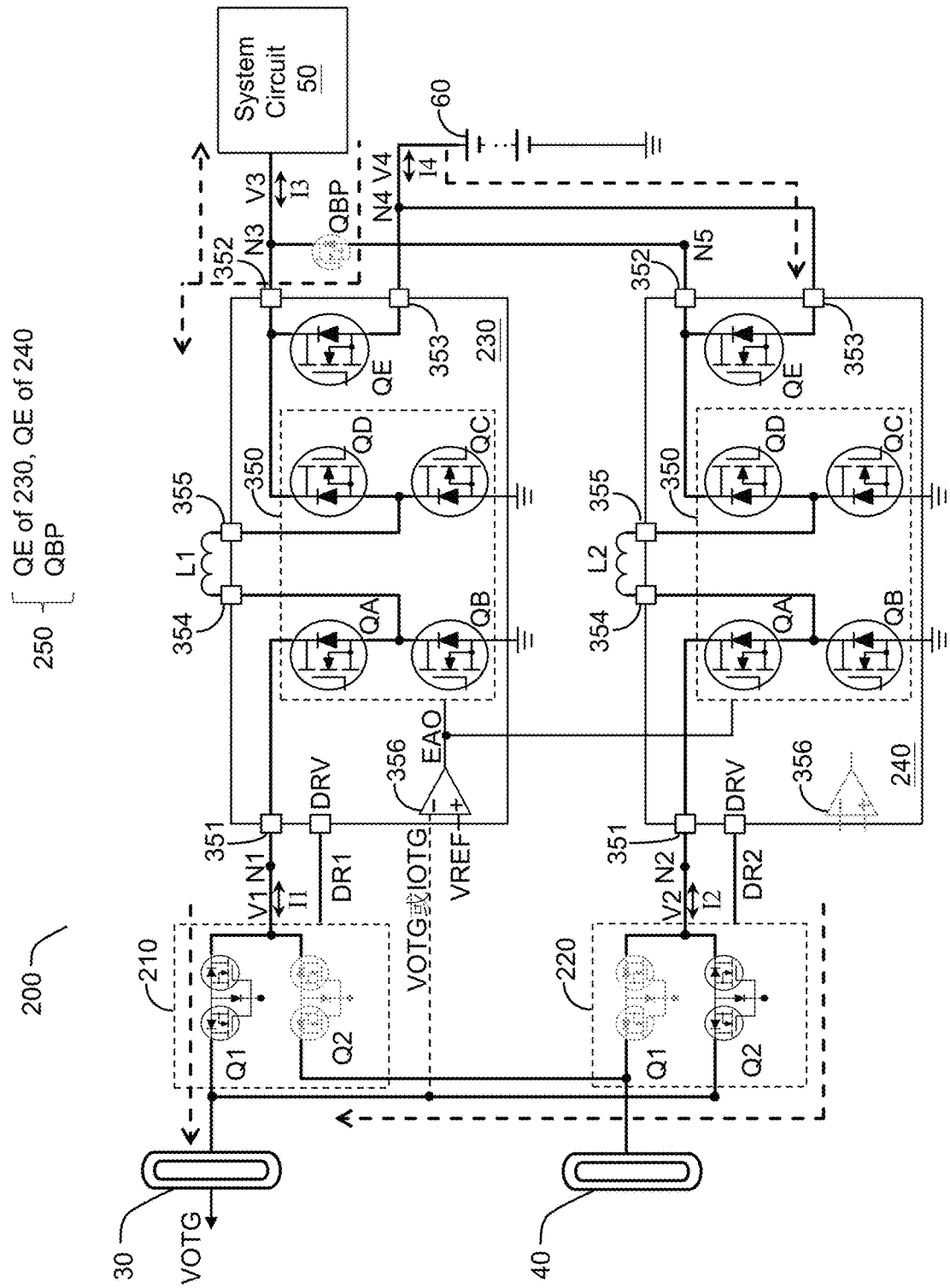

Please refer to FIG. 5C, which shows a circuit configuration of a power supply system according to a specific embodiment of the present invention and illustrates its operation mechanism. This embodiment shown in FIG. 5C is similar to the embodiment shown in FIG. 5A, but is different in that: in this embodiment, each of the power conversion module 230 and the power conversion module 240 further includes an error amplification circuit 356. In the single port parallel output mode, the conversion circuit 350 of the power conversion module 230 and the conversion circuit 350 of the power conversion module 240 are both controlled by one of the error amplification circuits 356. The error amplification circuit 356 controlling the conversion circuit 350 of the power conversion module 230 and the conversion circuit 350 of the power conversion module 240 is configured to operably generate an error amplification signal EAO according to a difference between an electric parameter (e.g., the output voltage VOTG or the output current IOTG) of the output power and a reference signal VREF. The error amplification signal EAO is configured to operably control the conversion circuit 350 of the power conversion module 230 and the conversion circuit 350 of the power conversion module 240. As exemplified by the embodiment shown in FIG. 5C, the conversion circuit 350 of the power conversion module 230 and the conversion circuit 350 of the power conversion module 240 are both controlled by the error amplification circuit 356 of the power conversion module 230. In another embodiment, the conversion circuit 350 of the power conversion module 230 and the conversion circuit 350 of the power conversion module 240 can be both controlled by the error amplification circuit 356 of the power conversion module 240.

Figure 6:
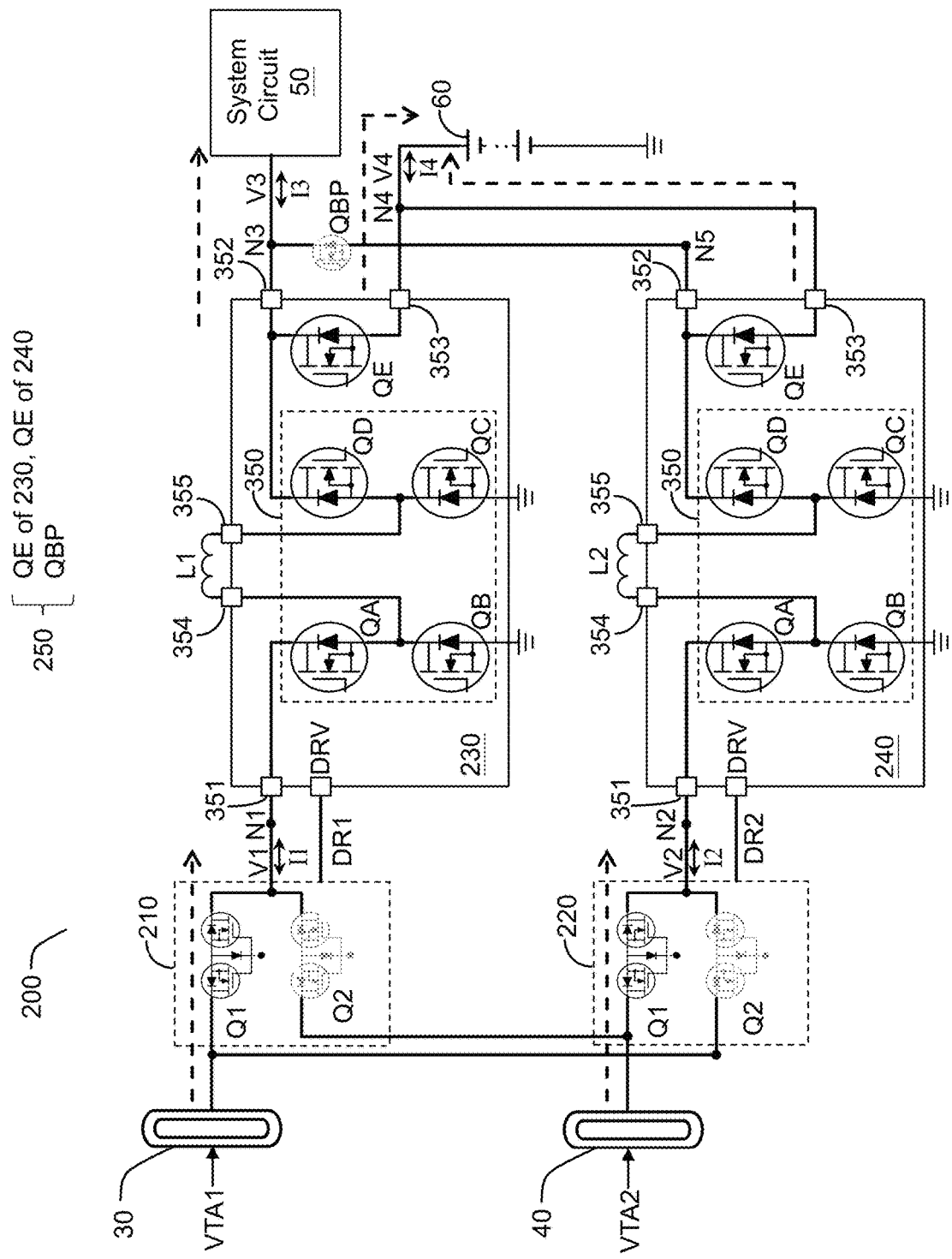
FIG. 6 and FIG. 7 show a circuit configuration of a power supply system according to a specific embodiment of the present invention and illustrate its operation mechanism.

Please refer to FIG. 6, which shows a circuit configuration of a power supply system according to a specific embodiment of the present invention and illustrates its operation mechanism. In a plural ports input mode, the first system port 30 and the second system port 40 receive a first external power VTA1 and a second external power VTA2, respectively. The external path selection circuit 210 and the external path selection circuit 220 control the first external power VTA1 and the second external power VTA2 to be electrically connected to the first node N1 and the second node N2 (i.e., the first input/output end 351 of the power conversion module 230 and the first input/output end 351 of the power conversion module 240), respectively. In this embodiment, the switch Q1 of the external path selection circuit 210 and the switch Q1 of the external path selection circuit 220 are both ON, whereas, the switch Q2 of the external path selection circuit 210 and the switch Q2 of the external path selection circuit 220 are both OFF.

Please still refer to FIG. 6. In the plural ports input mode, the conversion circuit 350 of the power conversion module 230 and the conversion circuit 350 of the power conversion module 240 are configured to respectively convert the first external power VTA1 and the second external power VTA2, so as to generate the third power at the third node N3 for providing power to the system circuit 50 and/or generate the fourth power at the fourth node N4 for charging the battery 60. In one embodiment, the power conversion module 230 charges the battery 60 via the corresponding switch QE. In one embodiment, the power conversion module 240 charges the battery 60 via the corresponding switch QE.

In one embodiment, the first external power VTA1 provides a constant current or the second external power VTA2 provides a constant current. In this embodiment, the power conversion module 230 and the power conversion module 240 can operate under a bypass mode. In one embodiment, the upper gate switch QA and the upper gate switch QD of the power conversion module operating under the bypass mode are always ON, whereas, the lower gate switch QB and the lower gate switch QC of the power conversion module operating under the bypass mode are always OFF, so that the constant current is directly transmitted to the fourth node N4, to thereby charge the battery 60 by constant current charging operation.

Figure 7:
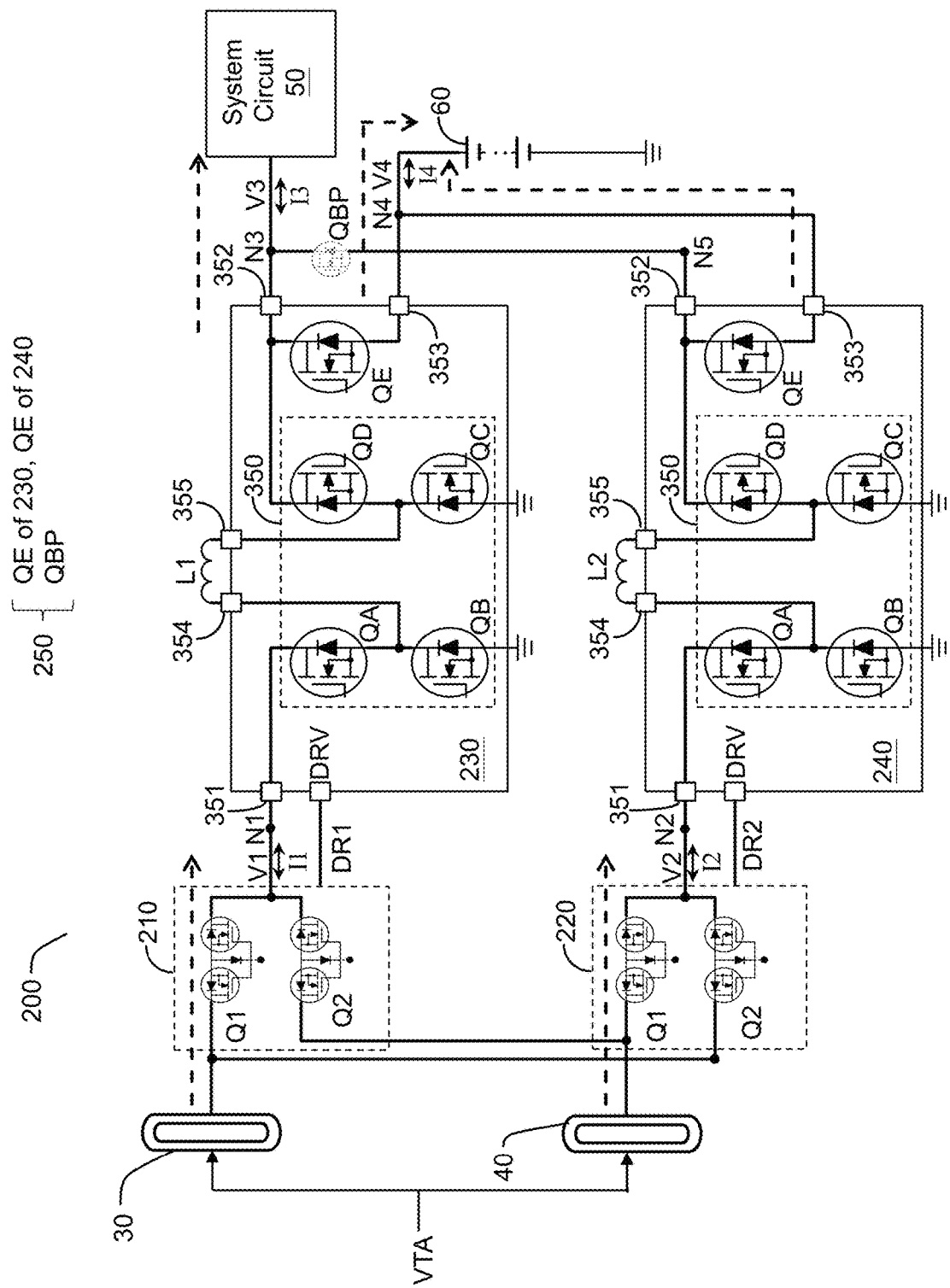

Please refer to FIG. 7, which shows a circuit configuration of a power supply system according to a specific embodiment of the present invention and illustrates its operation mechanism. In a plural ports parallel input mode, the first system port 30 and the second system port 40 both receive the external power VTA. For example, a large power adapter (e.g. USB PD) provide power to two ports at the same time. The external path selection circuit 210 and the external path selection circuit 220 control the external power VTA to be electrically connected to the first node N1 and the second node N2 (i.e., the first input/output end 351 of the power conversion module 230 and the first input/output end 351 of the power conversion module 240) via the first system port 30 and the second system port 40, respectively. In this embodiment, the switch Q1 and the switch Q2 of the external path selection circuit 210 and the switch Q1 and the switch Q2 of the external path selection circuit 220 are both ON, so as to effectively reduce the parasitic resistance on the power supply path.

Please still refer to FIG. 7. In the plural ports parallel input mode, the conversion circuit 350 of the power conversion module 230 and the conversion circuit 350 of the power conversion module 240 convert the external power VTA to generate the third power at the third node N3 for providing power to the system circuit 50, and/or, to generate the fourth power at the fourth node N4 for charging the battery 60. In one embodiment, the power conversion module 230 charges the battery 60 via the corresponding switch QE. In one embodiment, the power conversion module 240 charges the battery 60 via the corresponding switch QE.

In one embodiment, the external power VTA provides a constant current. In this embodiment, the power conversion module 230 and the power conversion module 240 can operate under a bypass mode. In one embodiment, the upper gate switch QA and the upper gate switch QD of the power conversion module 230 and the upper gate switch QA and the upper gate switch QD of the power conversion module 240 are always ON, whereas, the lower gate switch QB and the lower gate switch QC of the power conversion module 230 and the lower gate switch QB and the lower gate switch QC of the power conversion module 240 are always OFF, so that the constant current is directly transmitted to the fourth node N4, to thereby charge the battery 60 by constant current charging operation.

Figure 8A:
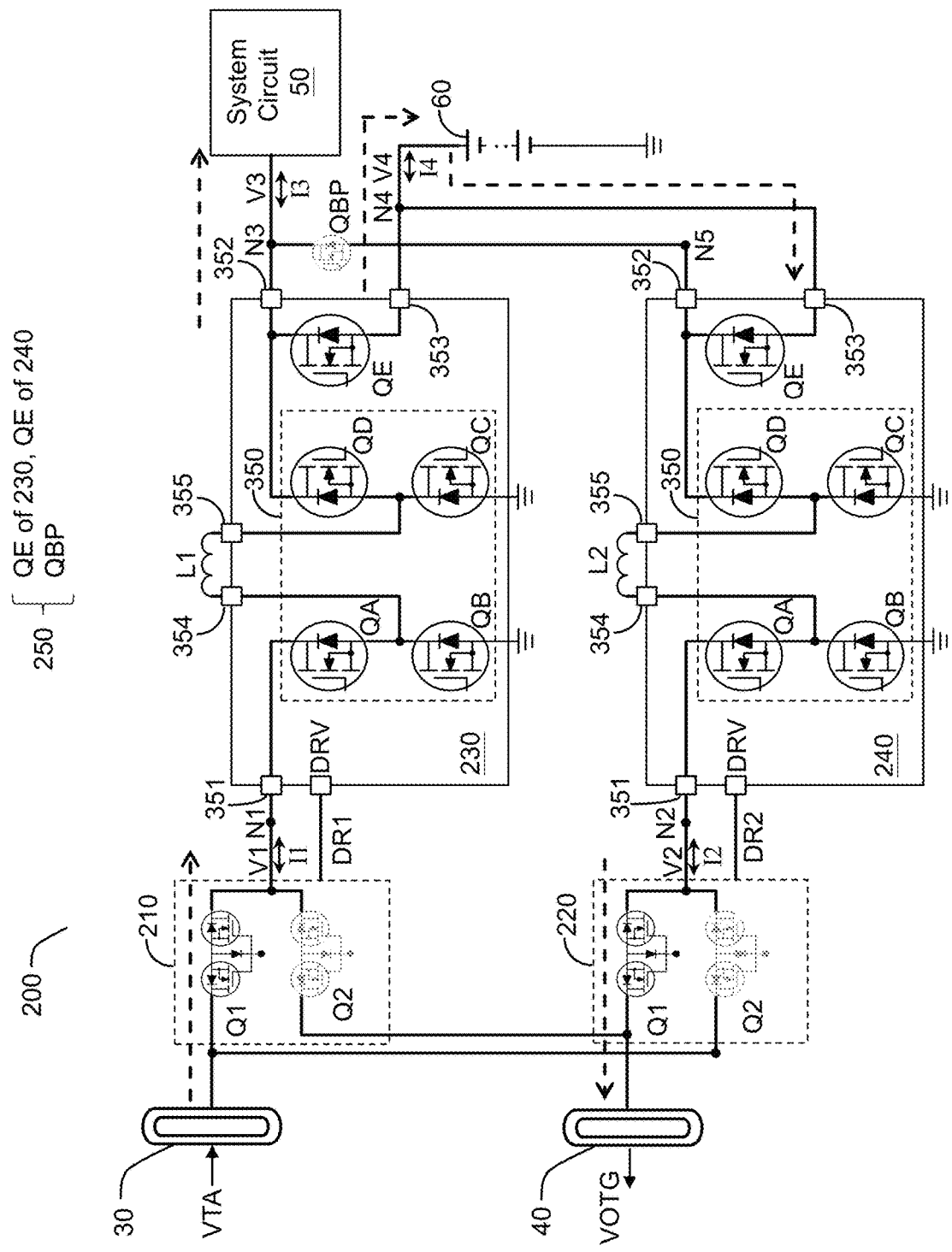
FIG. 8A and FIG. 8B show a circuit configuration of a power supply system according to a specific embodiment of the present invention and illustrate its operation mechanism.

Please refer to FIG. 8A, which shows a circuit configuration of a power supply system according to a specific embodiment of the present invention and illustrates its operation mechanism. In one embodiment, the power supply system 200 receives an external power VTA via the first system port 30 and generates an output power (corresponding to an output voltage VOTG and/or an output current IOTG) at the second system port 40. In this embodiment, the switch Q1 of the external path selection circuit 210 and the switch Q1 of the external path selection circuit 220 are both ON, whereas, the switch Q2 of the external path selection circuit 210 and the switch Q2 of the external path selection circuit 220 are both OFF, so as to electrically connect the external power VTA to the first node N1 via the first system port 30 and electrically connect the output power to the second node N2 via the second system port 40.

Please still refer to FIG. 8A. In one embodiment, the external path selection circuit 210 and the external path selection circuit 220 control the external power VTA to be electrically connected to the power conversion module 230 via the first system port 30, so as to execute power conversion. And, by control of the internal path selection circuit 250, the third power is generated at the third node N3, to provide power to the system circuit 50. In this embodiment, the power conversion module 230 can further charge the battery 60 via the corresponding switch QE.

Please still refer to FIG. 8A. In one embodiment, the internal path selection circuit 250 electrically connects the fourth power provided from the battery 60 to the power conversion module 240, so as to execute power conversion. And, by control of the external path selection circuit 210 and the external path selection circuit 220, an output power (corresponding to an output voltage VOTG and/or an output current IOTG) is generated at the second system port 40. In one embodiment, the switch QE of the power conversion module 240 is ON, so as to electrically connect the fourth node N4 to the conversion circuit 350 of the power conversion module 240.

In one embodiment, the external power VTA provides a constant current. In this embodiment, the power conversion module 230 can operate under a bypass mode. In one embodiment, the upper gate switch QA and the upper gate switch QD of the power conversion module 230 are always ON, whereas, the lower gate switch QB and the lower gate switch QC of the power conversion module 230 are always OFF, so that the constant current is directly transmitted to the fourth node N4, to thereby charge the battery 60 by constant current charging operation.

Figure 8B:
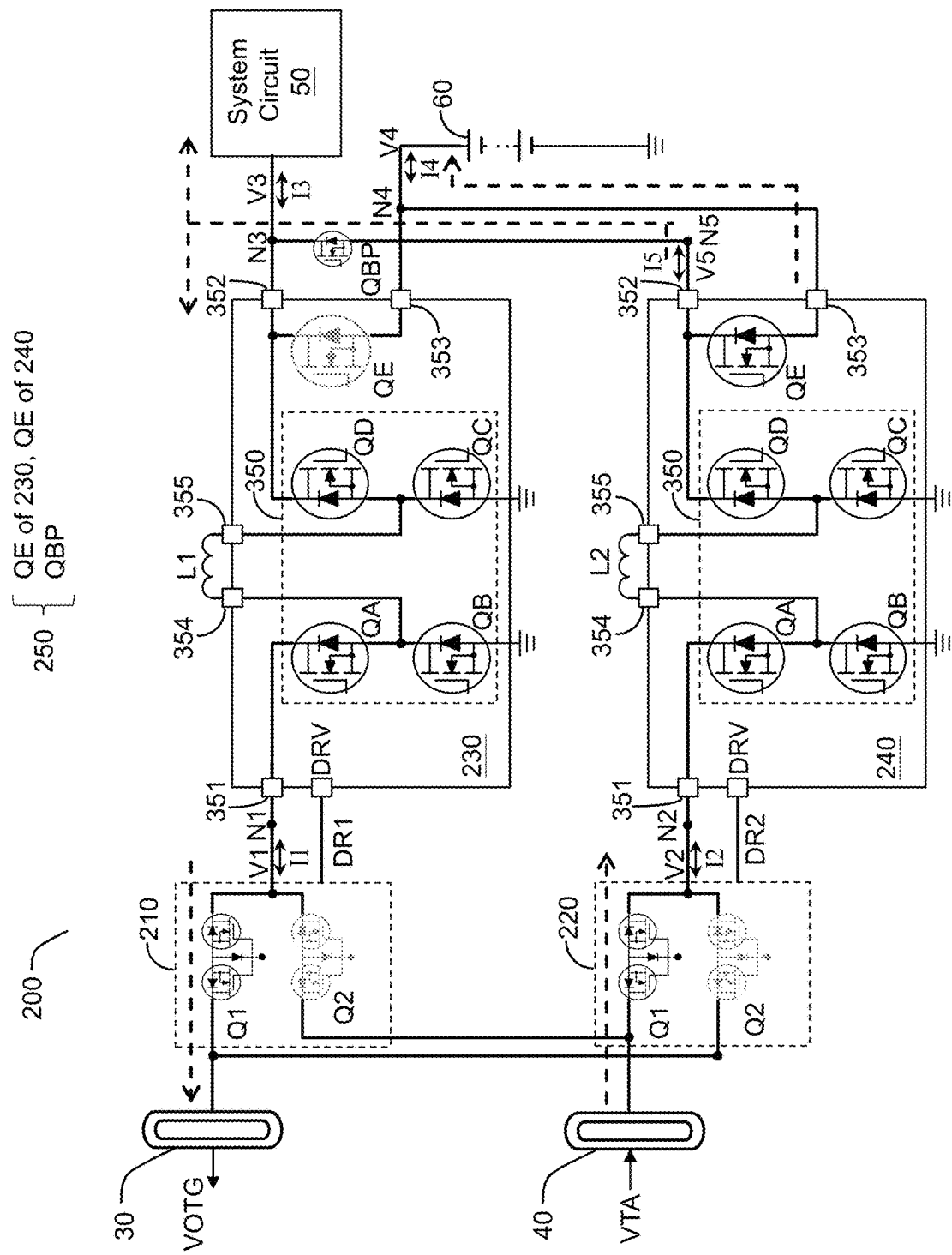

Please refer to FIG. 8B, which shows a circuit configuration of a power supply system according to a specific embodiment of the present invention and illustrates its operation mechanism. In a plural ports bilateral mode, the second system port 40 receives an external power VTA, and an output power is generated at the first system port 30. The external path selection circuit 210 and the external path selection circuit 220 electrically connect the external power VTA to the second node N2 via the second system port 40, so that the power conversion module 240 executes power conversion. And, by control of the internal path selection circuit 250, a fourth power is generated at the fourth node N4 for charging the battery 60 and/or a fifth power (corresponding to a fifth voltage V5 and/or a fifth current I5) is generated at the fifth node N5 for providing power to the system circuit 50. In this embodiment, the switch QE of the power conversion module 240 and the switch QBP are controlled to be ON, so that the power conversion module 240 provides power to the system circuit 50 via the switch QBP and also charges the battery 60 via the corresponding switch QE. The switch QBP is controlled to be ON, so that the fifth node N5 is electrically connected to the third node N3, thereby providing power to the system circuit 50. Besides, the fifth node N5 is electrically connected to the conversion circuit 350 of the power conversion module 230. It is worthwhile noting that, in other operation modes, the switch QBP can be OFF. The internal path selection circuit 250 electrically connects the third power to the power conversion module 230, so that the power conversion module 230 executes power conversion. And, by control of the external path selection circuit 210 and the external path selection circuit 220, the output power (corresponding to the output voltage VOTG and/or the output current IOTG) is generated at the first system port 30. In this embodiment, the switch QE of the power conversion module 230 can be OFF.

Please still refer to FIG. 8B. In this embodiment, the switch Q1 of the external path selection circuit 210 and the switch Q1 of the external path selection circuit 220 are both ON, whereas, the switch Q2 of the external path selection circuit 210 and the switch Q2 of the external path selection circuit 220 are both OFF.

Please still refer to FIG. 8B. In one embodiment, the external power VTA provides a constant current. In this embodiment, the power conversion module 240 can operate under a bypass mode. In one embodiment, the upper gate switch QA and the upper gate switch QD of the power conversion module 240 are always ON, whereas, the lower gate switch QB and the lower gate switch QC of the power conversion module 240 are always OFF, so that the constant current is directly transmitted to the fourth node N4, to thereby charge the battery 60 by constant current charging operation.

Figure 9:
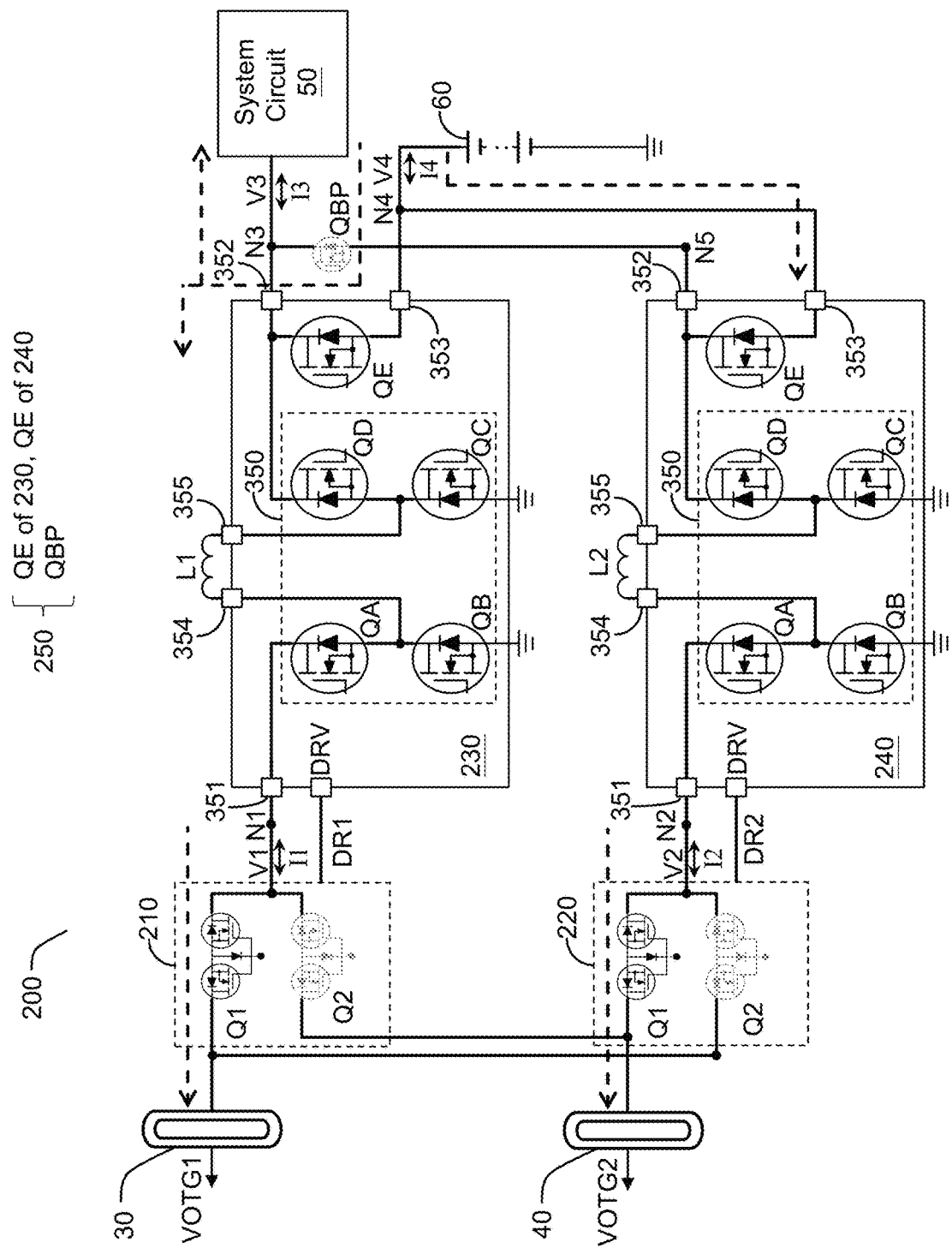
FIG. 9 shows a circuit configuration of a power supply system according to a specific embodiment of the present invention and illustrate its operation mechanism.

Please refer to FIG. 9, which show a specific embodiment illustrating a circuit configuration and an operation mechanism of a power supply system. As shown in FIG. 9, in a plural ports output mode, the internal path selection circuit 250 electrically connects the fourth power to the power conversion module 230 and the power conversion module 240, so that the power conversion module 230 and the power conversion module 240 are configured to convert the power from the battery 60. A first output power (corresponding to for example VOTG1) and a second output power (corresponding to for example VOTG2) are generated at the first system port 30 and the second system port 40, respectively, by control of the external path selection circuit 210 and the external path selection circuit 220. On the other hand, the battery 60 can provide power to the system circuit 50 via the switch QE of the power conversion module 230. The switch QE of the power conversion module 230 and the switch QE of the power conversion module 240 are both ON, so that the fourth node N4 (i.e., the power provided from the battery 60) is electrically connected to the conversion circuit 350 of the power conversion module 230 and the conversion circuit 350 of the power conversion module 240. In this embodiment, the switch Q1 of the external path selection circuit 210 and the switch Q1 of the external path selection circuit 220 are both ON, whereas, the switch Q2 of the external path selection circuit 210 and the switch Q2 of the external path selection circuit 220 are both OFF.

Figure 10:
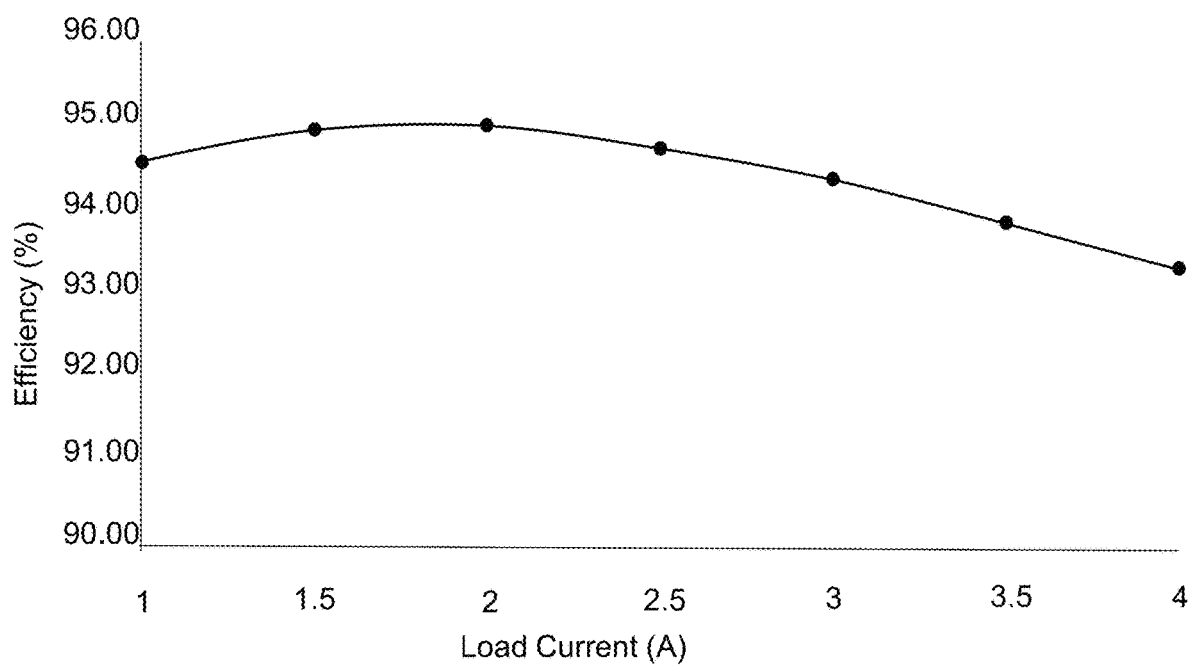
FIG. 10 shows a curve of efficiency versus load current corresponding to a single power conversion module of a power supply system according to an embodiment of the present invention.

Please refer to FIG. 10, which s shows a curve of efficiency versus load current corresponding to a single power conversion module of a power supply system according to an embodiment of the present invention. As shown in FIG. 10, a single power conversion module has an optimum conversion efficiency under a specific current level (e.g., a current level of 2 A). Because the conventional power supply system 100 can only execute power conversion via one single power conversion module, in a case when the power conversion module is required to provide a current higher than this specific current level, the prior art has a low conversion efficiency. As compared to the prior art, in an application wherein a high current is desired, the power supply system 200 of the present invention can configure plural power conversion modules to respectively operate at their optimum operation points (e.g., a lower current level such as 2 A) and provide the required output together, whereby the power supply system 200 of the present invention can operate by a much higher conversion efficiency.

The present invention provides a power supply system as described above. Advantages of the present invention include: that, by means of the first external path selection circuit, the second external path selection circuit and the internal path selection circuit, the power supply system of the present invention can use plural power conversion modules to execute power conversion through multiple paths in multiple power conversion modes; that the present invention can individually control the charging current; that the present invention can support sharing the charging current; that the present invention can provide power in a parallel fashion; that the present invention can enhance conversion efficiency; and that the present invention can optimize the utilization of power conversion modules.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system, comprising:
   a first external path selection circuit, which is configured to operably control a first power at a first node to be electrically connected to a first system port or a second system port;
   a second external path selection circuit, which is configured to operably control a second power at a second node to be electrically connected to the first system port or the second system port;
   a plurality of power conversion modules including a first power conversion module and a second power conversion module, wherein each of the first power conversion module and the second power conversion module includes a conversion circuit, a first input/output end and a second input/output end, wherein the conversion circuit is configured to operate an inductor, so as to execute bilateral power conversion between the first input/output end and the second input/output end, wherein the first input/output end of the first power conversion module is coupled to the first node, whereas, the first input/output end of the second power conversion module is coupled to the second node; and
   an internal path selection circuit coupled to the conversion circuits of the power conversion modules, wherein the internal path selection circuit is configured to operably control a third power at a third node to be electrically connected to the conversion circuit of the first power conversion module or the conversion circuit of the second power conversion module, and is configured to operably control a fourth power at a fourth node to be electrically connected to the conversion circuit of the first power conversion module or the conversion circuit of the second power conversion module;
   wherein the third power is coupled to a system circuit, whereas, the fourth power is coupled to a battery;
   wherein the first external path selection circuit, the second external path selection circuit, the power conversion modules and the internal path selection circuit selectively execute one of the following operations:
   (1) receiving at least one external power from at least one of the first system port or the second system port, so as to generate the third power at the third node for providing power to the system circuit and/or generate the fourth power at the fourth node for charging the battery; or
   (2) converting the power from the battery, so as to generate at least one output power at at least one of the first system port and the second system port.

2. The power supply system of claim 1, wherein the first external path selection circuit, the second external path selection circuit, the power conversion modules and the internal path selection circuit selectively execute one of the following operation modes:
   (A) in a single port input mode, the first external path selection circuit and the second external path selection circuit both receiving the external power via one of the first system port and the second system port and respectively controlling the external power to be electrically connected to the first input/output ends of the power conversion modules, and the conversion circuits operably converting the external power to generate the third power at the third node and/or generate the fourth power at the fourth node; or
   (B) in a single port parallel output mode, the conversion circuits converting the power from the battery together and in parallel, to generate the output power at one of the first system port and the second system port.

3. The power supply system of claim 2, wherein in the single port parallel output mode, an output current of the output power is constant.

4. The power supply system of claim 2, wherein in the single port parallel output mode, switching phases of the conversion circuits are interleaved with one another.

5. The power supply system of claim 2, wherein each power conversion module further includes an error amplification circuit, wherein in the single port parallel output mode, the conversion circuits are commonly controlled by one of the error amplification circuits, wherein the error amplification circuit controlling the conversion circuits is configured to operably generate an error amplification signal to control the conversion circuits according to a difference between an electric parameter of the output power and a reference signal.

6. The power supply system of claim 2, wherein the first external path selection circuit, the second external path selection circuit, the power conversion modules and the internal path selection circuit further selectively execute one of the following operation modes:
   (C) in a plural ports input mode, the first system port and the second system port receiving a first external power and a second external power, respectively, and the first external path selection circuit and the second external path selection circuit controlling the first external power and the second external power to be electrically connected to the first input/output end of the first power conversion module and the first input/output end of the second power conversion module, respectively, wherein the conversion circuits respectively convert the first external power and the second external power to generate the third power at the third node and/or generate the fourth power at the fourth node;
   (D) in a plural ports parallel input mode, the first system port and the second system port both receiving the external power, and the first external path selection circuit and the second external path selection circuit controlling the external power to be electrically connected to the first input/output end of the first power conversion module and electrically connected to the first input/output end of the second power conversion module, wherein the conversion circuits respectively convert the external power to generate the third power at the third node and/or generate the fourth power at the fourth node;
   (E) in a plural ports bilateral mode, one of the first system port and the second system port receiving the external power, while, the other one of the first system port and the second system port generating the output power, wherein the first external path selection circuit and the second external path selection circuit control the external power to be electrically connected to a corresponding one of the power conversion modules via the one of the first system port and the second system port, so as to execute power conversion and to generate the third power at the third node and/or the fourth power at the fourth node by control of the internal path selection circuit;
   wherein the internal path selection circuit controls the fourth power or the third power to be electrically connected to the other power conversion module, so as to execute power conversion and to generate the output power at the other one of the first system port and the second system port by control of the first external path selection circuit and the second external path selection circuit; or (F) in a plural ports output mode, the internal path selection circuit controlling the fourth power to be electrically connected to a corresponding one of the power conversion modules, so that the conversion circuits convert the power from the battery to generate a first output power and a second output power at the first system port and the second system port, respectively, by control of the first external path selection circuit and the second external path selection circuit.

7. The power supply system of claim 6, wherein in the operation mode (C), the first external power provides a constant current or the second external power provides a constant current, or wherein in the operation mode (D) and the operation mode (E), the external power provides the constant current.

8. The power supply system of claim 7, wherein in the operation mode (C), the operation mode (D) and the operation mode (E), at least one of the power conversion modules is further configured to operate under a bypass mode wherein a part of switches of this power conversion module are always ON, whereas, another part of switches of this power conversion module are always OFF, so that the battery is directly charged by constant current charging operation.

9. The power supply system of claim 2, wherein each of the first external path selection circuit and the second external path selection circuit has a first end, a second end and a third end, and wherein each of the first external path selection circuit and the second external path selection circuit includes:
a first switch coupled between the first end and the second end; and
a second switch coupled between the first end and the third end;
wherein the first external path selection circuit has its first end, second end and third end coupled to the first node, the first system port and the second system port, respectively;
wherein the second external path selection circuit has its first end, second end and third end coupled to the second node, the second system port and the first system port, respectively.

10. The power supply system of claim 6, wherein each of the power conversion modules further has a third input/output end and further includes:
a third switch coupled between the second input/output end and the third input/output end of the power conversion module;
wherein the second input/output end and the third input/output end of the first power conversion module are coupled to the third node and the fourth node, respectively;
wherein the third input/output end of the second power conversion module is coupled to the fourth node;
wherein the internal path selection circuit includes the third switches of the power conversion modules.

11. The power supply system of claim 2, wherein each of the power conversion modules further includes: a first switching end and a second switching end, wherein the conversion circuit of each power conversion module is a buck-boost switching converter and includes:
a first upper gate switch coupled between the first input/output end and the first switching end;
a first lower gate switch coupled between the first switching end and a ground level;
a second upper gate switch coupled between the second input/output end and the second switching end; and
a second lower gate switch coupled between the second switching end and the ground level;
wherein the conversion circuit of the first power conversion module is configured to operate a first inductor, so as to execute bilateral power conversion between the first input/output end and the second input/output end of the first power conversion module, wherein the first inductor is coupled between the first switching end and the second switching end of the first power conversion module;
wherein the conversion circuit of the second power conversion module is configured to operate a second inductor, so as to execute bilateral power conversion between the first input/output end and the second input/output end of the second power conversion module, wherein the second inductor is coupled between the first switching end and the second switching end of the second power conversion module.

12. The power supply system of claim 6, wherein the internal path selection circuit further includes:
a fourth switch coupled between the third node and a fifth node, wherein the fifth node is coupled to the second input/output end of the second power conversion module.

13. The power supply system of claim 10, wherein the internal path selection circuit further includes:
a fourth switch coupled between the third node and a fifth node, wherein the fifth node is coupled to the second input/output end of the second power conversion module;
wherein in the operation mode (E), the second system port receives the external power, and wherein in a case when the output power is generated at the first system port, the fourth switch is controlled to be ON, so that the second power conversion module provides power to the system circuit via the fourth switch and the second power conversion module charges the battery via the third switch.

14. The power supply system of claim 10, wherein the first power conversion module charges the battery via the third switch and/or the second power conversion module charges the battery via the third switch.

15. The power supply system of claim 10, wherein the battery provides power to the system circuit via the third switch of the first power conversion module.

16. The power supply system of claim 1, wherein the first system port and the second system port are system ports complying with universal serial bus power delivery (USB PD) specification.

17. The power supply system of claim 1, wherein each power conversion module is integrated into an integrated circuit.

18. The power supply system of claim 9, wherein the first external path selection circuit and the second external path selection circuit are integrated into an integrated circuit.

* * * * *